United States Patent
Bader

(10) Patent No.: US 12,151,328 B2
(45) Date of Patent: Nov. 26, 2024

(54) DEVICE FOR SWIVELLING, TURNING AND CHANGING WORKPIECE PALLETS ON A HORIZONTAL MACHINING CENTER, AS WELL AS PALLET CARRIERS

(71) Applicant: BAVIUS TECHNOLOGIE GMBH, Baienfurt (DE)

(72) Inventor: Simon Bader, Rot an der Rot (DE)

(73) Assignee: BAVIUS TECHNOLOGIE GMBH, Baienfurt (DE)

( * ) Notice: Subject to any disclaimer, the term of this patent is extended or adjusted under 35 U.S.C. 154(b) by 242 days.

(21) Appl. No.: 17/753,666

(22) PCT Filed: Aug. 10, 2020

(86) PCT No.: PCT/EP2020/072338
§ 371 (c)(1),
(2) Date: Mar. 10, 2022

(87) PCT Pub. No.: WO2021/047837
PCT Pub. Date: Mar. 18, 2021

(65) Prior Publication Data
US 2022/0331918 A1     Oct. 20, 2022

(30) Foreign Application Priority Data
Sep. 11, 2019   (DE) .................. 10 2019 213 871.3

(51) Int. Cl.
*B23Q 1/66*   (2006.01)
*B23Q 1/00*   (2006.01)
*B23Q 7/14*   (2006.01)

(52) U.S. Cl.
CPC ............. *B23Q 1/66* (2013.01); *B23Q 1/0027* (2013.01); *B23Q 7/1431* (2013.01); *B23Q 7/1463* (2013.01)

(58) Field of Classification Search
CPC ...... B23Q 1/66; B23Q 1/0027; B23Q 7/1431; B23Q 7/1463
See application file for complete search history.

(56) References Cited

U.S. PATENT DOCUMENTS

| | | | |
|---|---|---|---|
| 4,637,108 A | 1/1987 | Murata et al. | |
| 6,382,400 B1 * | 5/2002 | Hofele | B23Q 1/52 198/750.12 |

(Continued)

FOREIGN PATENT DOCUMENTS

| | | | |
|---|---|---|---|
| CN | 104364049 A | 2/2015 | |
| CN | 103846718 B * | 11/2016 | ........... B23Q 7/1431 |

(Continued)

OTHER PUBLICATIONS

ISA European Patent Office, International Search Report Issued in Application No. PCT/EP2020/072338, Nov. 5, 2020, WIPO, 5 pages.

*Primary Examiner* — Gene O Crawford
*Assistant Examiner* — Abby A Jorgensen
(74) *Attorney, Agent, or Firm* — McCoy Russell LLP

(57) ABSTRACT

In a device for swivelling, turning and changing pallets on a horizontal machining center, with swivel arms that can be synchronously swiveled about a swivel axis, each of them having a pallet carrier turnable around a turning axis, for docking and undocking of at least one pallet, which can be connected to a power supply that also provides a vacuum for fixing the workpiece; on the pallet carrier, a power supply interface connected with the power supply via the swivel arm is provided which can be moved along.

13 Claims, 2 Drawing Sheets

(56) References Cited

U.S. PATENT DOCUMENTS

| | | |
|---|---|---|
| 7,128,198 B2 | 10/2006 | Yoshida et al. |
| 2005/0163600 A1 | 7/2005 | Grob et al. |
| 2018/0304428 A1 | 10/2018 | Hediger |

FOREIGN PATENT DOCUMENTS

| | | | | |
|---|---|---|---|---|
| CN | 106112671 B | * | 4/2018 | |
| CN | 109048662 A | | 12/2018 | |
| CN | 112496836 A | | 3/2021 | |
| DE | 2713706 A1 | | 10/1977 | |
| DE | 10218188 C1 | | 6/2003 | |
| DE | 102004036371 A1 | | 2/2006 | |
| DE | 102017217878 A1 | | 4/2019 | |
| DE | 102020123642 A1 | * | 3/2021 | ............... B23Q 1/66 |
| EP | 1375057 A1 | * | 1/2004 | ........... B23Q 1/0018 |
| EP | 2052808 B1 | | 3/2010 | |
| FR | 2570631 A1 | | 3/1986 | |
| FR | 2972951 A1 | * | 9/2012 | ............... B23Q 1/66 |
| GB | 2218360 A | * | 11/1989 | ............. B23Q 39/04 |
| JP | H045337 U | | 1/1992 | |
| JP | H0731945 Y2 | * | 7/1995 | |
| JP | H1012878 A | | 1/1998 | |
| JP | 2006021262 A | | 1/2006 | |
| JP | 2008087125 A | | 4/2008 | |
| JP | 2008110446 A | | 5/2008 | |
| JP | 2017195218 A | | 10/2017 | |
| KR | 101927753 B1 | * | 12/2018 | |
| RU | 2257287 C1 | | 7/2005 | |
| SU | 794927 A1 | | 5/1983 | |
| WO | WO-0138042 A1 | * | 5/2001 | ............... B23Q 1/40 |
| WO | WO-0194071 A1 | * | 12/2001 | ............... B23Q 1/52 |
| WO | WO-2004108349 A2 | * | 12/2004 | ........... B23Q 1/4842 |
| WO | WO-2014003695 A1 | * | 1/2014 | ............. F16L 37/23 |

\* cited by examiner

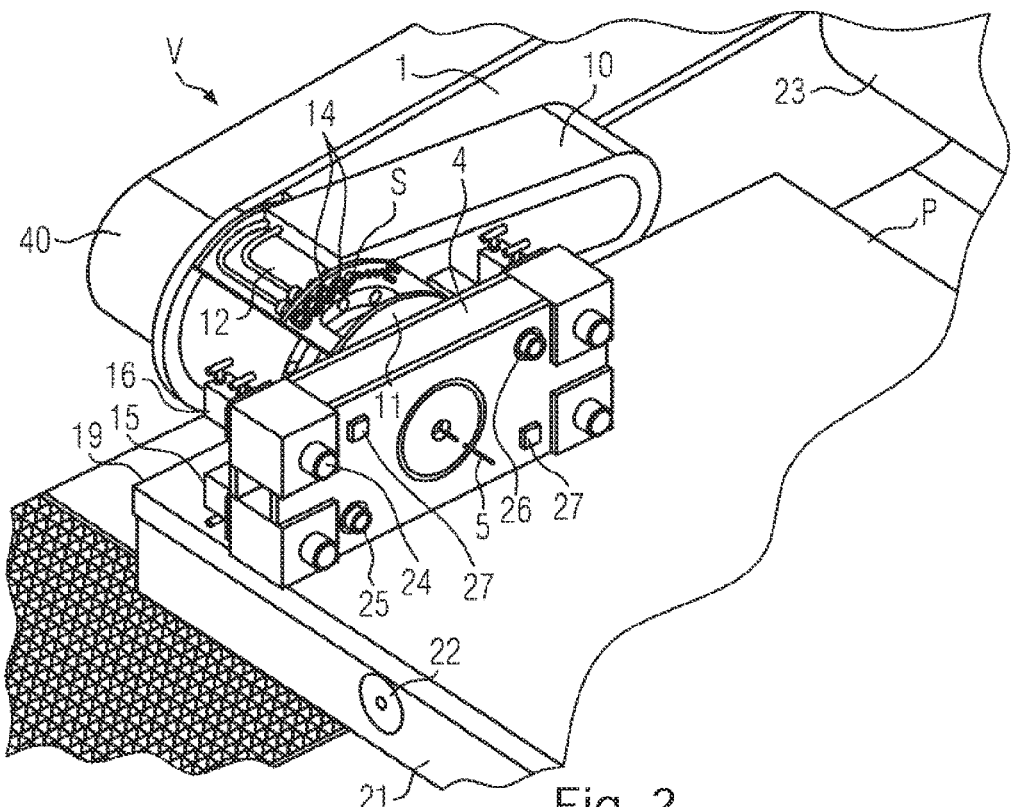
Fig. 2
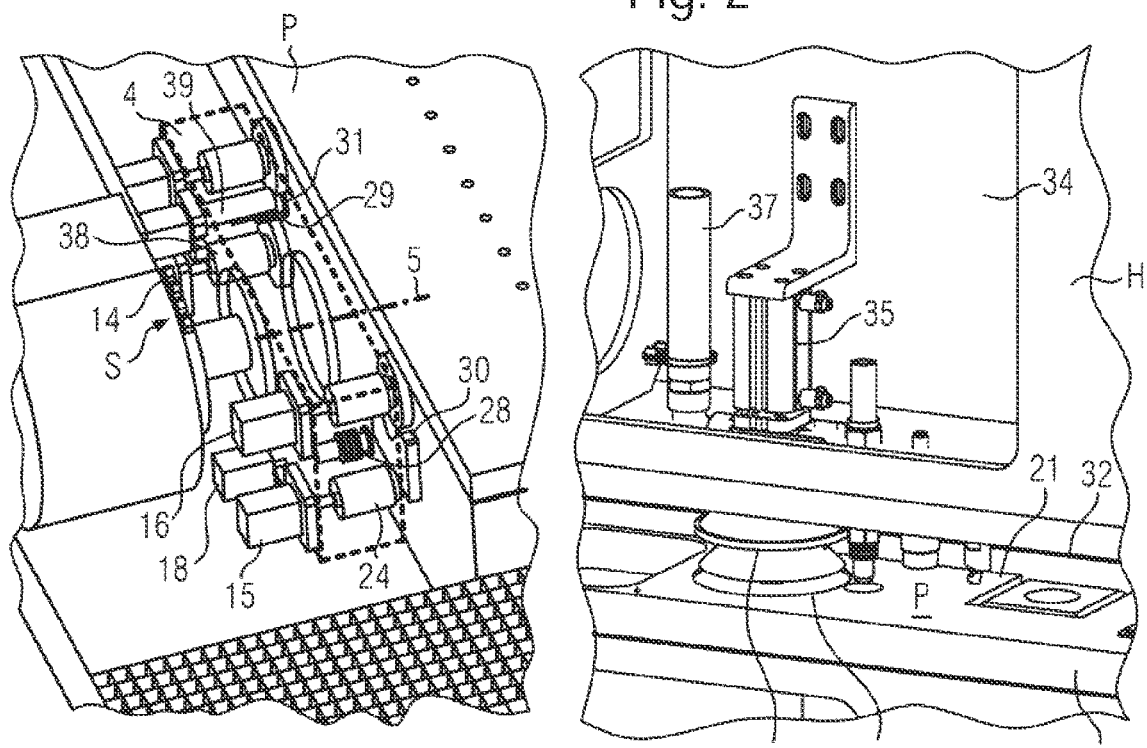
Fig. 3
Fig. 4

DEVICE FOR SWIVELLING, TURNING AND CHANGING WORKPIECE PALLETS ON A HORIZONTAL MACHINING CENTER, AS WELL AS PALLET CARRIERS

CROSS REFERENCE TO RELATED APPLICATIONS

The present application is a U.S. National Phase of International Application No. PCT/EP2020/072338 entitled "APPARATUS FOR PIVOTING, TURNING AND CHANGING WORKPIECE PALLETS ON A HORIZONTAL PROCESSING CENTER, AND PALLET CARRIER," and filed on Aug. 10, 2020. International Application No. PCT/EP2020/072338 claims priority to German Patent Application No. 10 2019 213 871.3 filed on Sep. 11, 2019. The entire contents of each of the above-listed applications are hereby incorporated by reference for all purposes.

TECHNICAL FIELD

The disclosure relates to a device as well as to a pallet carrier.

BACKGROUND AND SUMMARY

It is known from practice to connect two pallets docked back to back to the pallet carriers together to the energy supply of the horizontal machining center. However, this connection concept results in the disadvantage that a single pallet at least cannot be removed because it is then not supplied with the vacuum required to fix the workpiece on the pallet during swivelling and turning. This also results in a loss of time in a pallet change cycle.

The object of the disclosure is to improve a device and a pallet carrier of the aforementioned type such that even a single pallet can at least be removed from the horizontal machining center or introduced into it without jeopardizing its vacuum supply.

Since the respective pallet is not supplied from the horizontal machining center during swivelling and turning but rather via the energy supply interface attached to the pallet carrier, the vacuum supply is also guaranteed when picking up, swivelling and turning as well as removing an individual pallet. Other working media and signals for operating the pallet carrier can also be permanently transmitted via the interface.

When changing pallets, the pallet carrier equipped with the energy supply interface makes it possible to continuously supply working media, at least with a vacuum for fixing at least one workpiece on the set-up side of the pallet, during the turning and swivelling movements of even just one pallet, independently of the machining center.

The interface is expediently arranged on a driver plate connected to the pallet carrier, which may be fixed to the outside of the pallet carrier facing the swivel arm, and which extends from the pallet carrier to the free end of the swivel arm. The interface is stably supported and easily accessible at all times when it moves with the pallet carrier relative to the swivel arm.

The driver plate is screwed to the pallet carrier in a stable manner and with a favourable assembly. It can have a curved course.

The interface expediently has a plurality of connections at least for vacuum and/or pneumatics and/or hydraulics and/or electrical or optical signals and/or electricity and the like. These working media and the signals are used to operate the pallet carrier and, if necessary, to monitor a pallet that is to be docked or has been docked.

So that the interface can move with the pallet carrier, it is connected via a flexible and movable supply line duct, supported by the swivel arm, for example with the stationary energy supply. Various lines and cables run in the supply line duct and are thus protected so that they do not collide with the pallet or pallets, the swivel arm and the pallet carrier.

The connections of the interface can be linked with inlets arranged on or in the pallet carrier via fixed or loosely installed connecting lines, such as with quick-release couplings.

For example, one vacuum inlet each on the pallet carrier is connected with one of at least two vacuum bells arranged in such a way that they can pneumatically extend to a vacuum inlet of the respective pallet and retract into the pallet carrier, with each vacuum bell optionally being activatable or deactivatable via a valve. The vacuum bell respectively interacting with one pallet can be activated via the valve whereas, in the event that a second pallet is absent, the vacuum bell provided for this remains deactivated in order to prevent the vacuum from collapsing. The vacuum required to fix the workpiece is reliably transmitted via the respective vacuum bell over large cross-sections with a high throughput as soon as the vacuum bell is in sealing contact with the pallet.

Furthermore, one hydraulic inlet respectively can be connected on the pallet carrier to a pair of hydraulic cylinders per pallet level of the pallet carrier, by means of which the respective pallet can be docked on or docked off in one of two pallet levels via extendable and retractable props. Thus, the device can simultaneously manipulate two pallets, then back to back, or a single pallet at a time in either of the two pallet levels of the pallet carrier.

Furthermore, on the pallet carrier, an electrical and/or optical inlet can be connected with at least one signal transmitter, such as an inductive or optical coupler, arranged on the inside of the pallet carrier, for example, to monitor that the pallet is properly docked on and the docking condition of the pallet.

Since the pallet is undocked from the device when a pallet is in the machining position in the horizontal machining center, it is expedient if a pallet which is fixed in the machining position in the horizontal machining center and which is undocked by the pallet carriers can be connected with at least one vacuum bell adjustable in the horizontal machining center.

This vacuum bell in the horizontal machining center then ensures that the pallet is supplied with the correct vacuum.

BRIEF DESCRIPTION OF THE FIGURES

Embodiments of the subject disclosure are explained with reference to the drawings. The following is shown:

FIG. 2 is a perspective view of FIG. 1 in a different viewing direction, FIG. 3 is a top perspective view, in phantom presentation, to details of the device, and FIG. 4 is a perspective presentation of a section of a horizontal machining center with a pallet fixed in the machining position.

DETAILED DESCRIPTION

Figure 1:
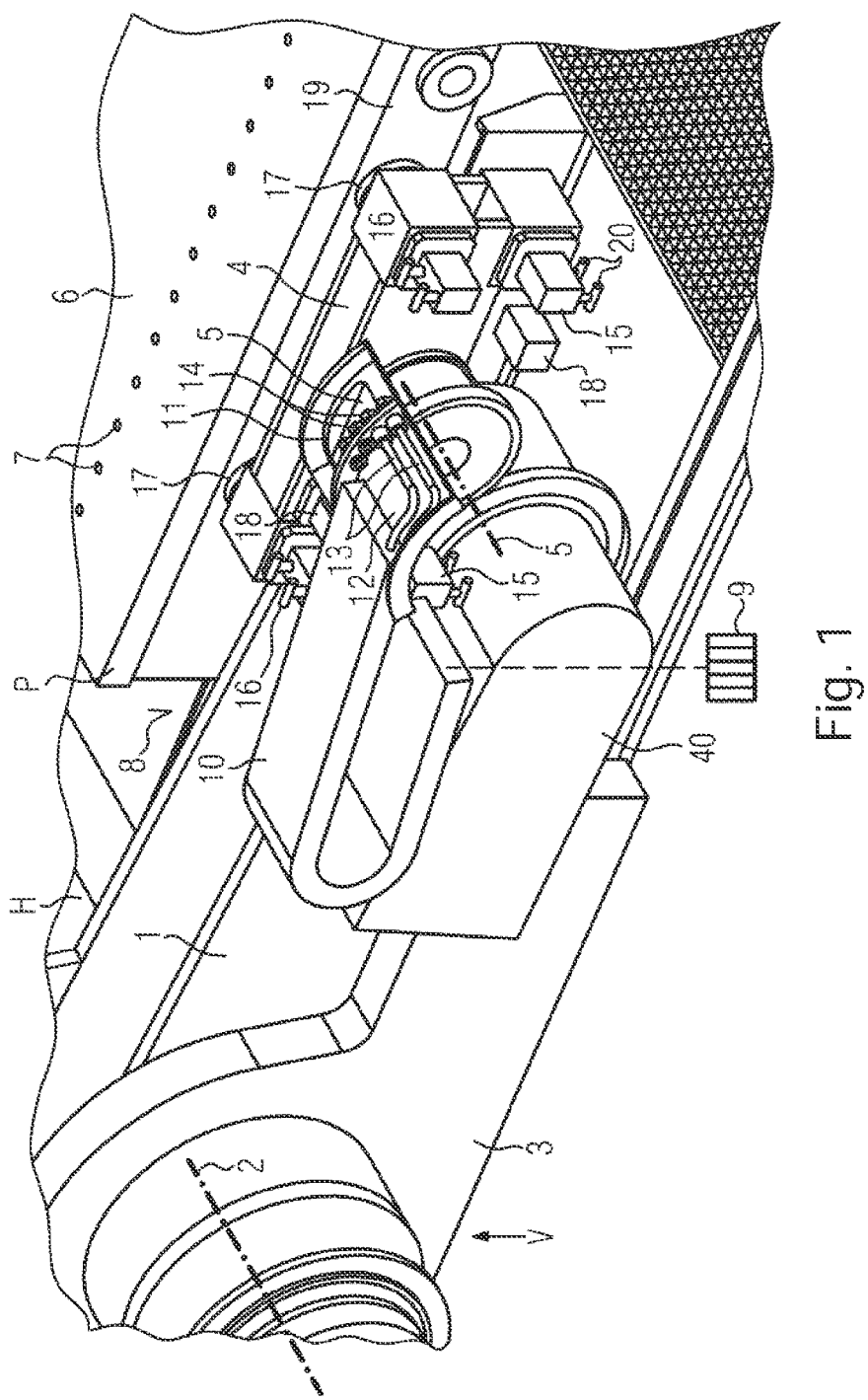
FIG. 1 is a perspective view of one half of a device for swivelling, turning and changing pallets on a horizontal machining center.

A device V shown in FIGS. 1 to 3 for swivelling, turning and changing workpiece pallets P, a so-called pallet changing automation is attached, for example, to the front of a horizontal machining center H, in which workpieces, for example aircraft parts, are machined while positioned on a pallet P when changing and machining under vacuum conditions. For this purpose, pallet P has, on its set-up side 6 facing away from the back, a plurality of suction openings 7 to which vacuum is applied, while in the machining position shown in FIG. 4, pallet P is clamped fix with at least one workpiece in the horizontal machining center H and a vacuum is also applied to it in the machining position.

In FIGS. 1 and 2, the device V is provided with two swivel arms 1 (only one of them is shown) which are mounted on the horizontal machining center H and, if necessary, with bearing block strings 3 supported on the floor, and which are swivable back and forth around a swivel axis 2 from the position shown close to the ground on both sides of a pallet support 8 through about 90° to an approximately vertical position. Near the free end of the swivel arm, each swivel arm 1 carries a block-shaped pallet carrier 4 which can be turned for about 180° on a turning axis 5 parallel to the swivel axis 2 and is used to manipulate one or two pallets P, which can be docked and undocked on both pallet carriers 4 in two pallet levels.

FIG. 1 shows the pallet P with its setup side 6 pointing upwards and the suction openings 7 arranged therein in a position on the pallet support 8.

For example, a stationary power supply 9, which, if necessary, may belong to the horizontal machining center H, provides different working media or signals or electricity that are used to change pallets and specifically to operate devices in each pallet carrier 4. These are, for example, vacuum, pneumatics, hydraulics, electrical or optical signals, electrical current and the like.

Cables and lines which are not shown are accommodated in a flexible, overly long cable duct 10 optionally supported on the swivel arm 1 or on a housing 40 covering the drive (not shown) for turning the pallet carrier 4 about the turning axis 5 on the swivel arm 1; the cables and lines lead to an energy supply interface S, arranged on a driver plate 11, 12 mounted, for example by screws, on the outside pointing to the swivel arm 1. For example, lines 13 are indicated which are installed on the, e.g., curved driver plate 11, 12. The energy supply interface S has a plurality of connections 14 which are connected with inlets, for example, 20 and 39, on and in the pallet carrier 4 via lines and cables which are not shown. The upper side of the driver plate 11, 12 that is visible in FIGS. 1 and 2 can be closed by a cover that shields the interface S and is not shown. Lines from the connections 14 to and into the pallet carrier 4 can be routed through a window in the driver plate 11, 12.

In the embodiment shown, the pallet carrier 4 has the attached hydraulic cylinders 16 and 15, each in pairs, that define the two pallet levels, with which props 24 shown in FIG. 3 are hydraulically retractable in receivers 17 open on a front end 19 of pallet P in order to dock up the pallet P. Furthermore, for example, one pneumatic cylinder 18 each per pallet level is mounted on the pallet carrier 4, which can be applied for adjusting the vacuum bells 28, 29 shown in FIG. 3 (at least one per pallet level) against vacuum inlets 30, 29 in the front end 19 of the pallet P. Electrical cables (not shown) also run, for example, to signal transmitters 27, e.g. inductive or opto-couplers, which are arranged on the inside of the pallet carrier 4. Suction areas 25, 26 (at least one per pallet level) belonging to vacuum bells 28, 29 are shown in FIG. 2 on the inside of the pallet carrier 4.

According to FIG. 2, at least one suction inlet 22 is also provided on the long side of the pallet P, which, according to FIG. 4, receives vacuum for applying it to pallet P in the machining position in the horizontal machining center H.

According to FIG. 2, the swivel arms 1 can actually be non-rotatably coupled about the swivel axis 2 via a vertical shaft 23.

In FIG. 2, props 24 for the upper pallet level and the props 24 for the lower pallet level are outlined in their extended condition. The props can optionally be extended and retracted in pairs each, in order to dock on or dock off a pallet P in one of the pallet levels.

According to FIG. 3, the vacuum bells 28 and 29 can be optionally adjusted to the suction points 26, 25 by means of the pneumatic cylinders 18. Valves, not shown, are provided in order to optionally deactivate or activate each vacuum bell 28, 29. In the front end 19, suction openings 30, 31 (at least one per pallet level) are outlined in some areas. Furthermore, FIG. 3 shows a connecting line 38 e.g. with a solenoid valve, not shown, from a vacuum connection 14 of the energy supply interface S to an inlet 39 to the vacuum bell 29.

When turning the docked pallet P according to FIG. 1 around the turning axis 5, the flexible line duct 10 unwinds more or less according to the rotation of the pallet carrier 4 relative to the swivel arm 1 so that the pallet carrier 4 or the docked pallet P is permanently supplied with the respective working medium, or signals can be given or tapped.

To transfer the pallet P shown in FIG. 1 with a workpiece fixed on the set-up side 6 and to change the pallet P located in the working position of the horizontal machining center H, the pallet P docked according to FIG. 1 is first swivelled up by the swivel arms 1 by about 45°, and then or upon it, turned clockwise so that its back facing away from the set-up side 6 will point towards the back 33 of pallet P located in the machining position according to FIG. 4 in the horizontal machining center. The pallet carriers 4 are then swivelled with the lower, free pallet levels by the swivel arms 1 past the front ends 19 of the pallet P in the machining position and docked thereto so that both pallets P are now positioned back to back in the device. Pallet P which is in the machining position is released in the horizontal machining center, after which the swivel arms 1 swivel down by approx. 45°, both docked pallets are turned e.g. counter-clockwise so that the pallet P shown in FIG. 1 will be brought into the machining position in the horizontal machining center and firmly clamped there with its set-up side 6 and the workpiece on it and will be undocked by the pallet carriers 4, while the pallet P removed beforehand will remain docked. Then the removed pallet P with the machined or partially machined workpiece is lowered by about 45° with the swivel arms 1 and turned around the turning axis 5 in such a way that its set-up side finally faces upwards when it is placed on the pallet support 8 and undocked. During this changeover process, the two pallets or each individual pallet respectively are supplied at least with a vacuum via the energy supply interface S.

Since the pallet brought into the horizontal machining center H and firmly clamped there and undocked from the pallet carriers 4 can no longer be supplied with a vacuum via the interface S of the pallet carrier 4, there is at least one separate vacuum supply 37 provided in the horizontal machining center H according to FIG. 4, for example in a section 34. FIG. 4 actually shows the long side of the pallet P with the suction connection 22 shown in FIG. 2 and against which a vacuum bell 36 is applied, for example by means of a pneumatic cylinder 35. FIG. 4 outlines a section 32 provided for clamping the pallet P in the machining position of the horizontal machining center H and for machining, in which pallet P remains clamped with its outwardly pointing back 33 while the workpiece is machined.

Both pallet carriers 4 of the device V are expediently equipped with a power supply interface S, although it would be sufficient to equip only one pallet carrier 4 in this way.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for swivelling, turning and changing workpiece pallets on a horizontal machining center, with two spaced swivel arms that can be swivelled synchronously and parallel to one another about a swivel axis, each of which has a pallet carrier that can be turned about a turning axis parallel to the swivel axis for docking and undocking of at least one pallet, where each pallet is connected, at least when turning and swivelling, to an energy supply which also provides a vacuum for fixing a workpiece, wherein, on at least one pallet carrier, a connectable power supply interface is provided and movable upon swivelling the two spaced swivel arms and turning the pallet carrier, connected with the energy supply and linkable with every docked pallet, wherein a pallet fixed in a machining position of the horizontal machining center and undocked from the pallet carrier is connectable with at least one vacuum bell adjustable at the horizontal machining center.

2. The device according to claim 1, wherein the connectable power supply interface is arranged on a driver plate connected with the pallet carrier, which is fixed on the outside of the pallet carrier facing the corresponding swivel arm, and which extends from the pallet carrier to beyond the free end of the corresponding swivel arm.

3. The device according to claim 2, wherein the driver plate is screwed to the pallet carrier.

4. The device according to claim 1, wherein the connectable power supply interface has a plurality of connections for vacuum and/or pneumatics and/or hydraulics and/or electrical or optical signals and/or electricity.

5. The device according to claim 2, wherein the connectable power supply interface is connected to the energy supply via a flexible and movable supply line duct.

6. The device according to claim 4, wherein the connections are connectable via permanently or loosely installed connecting lines with inlets arranged on or in the pallet carrier.

7. The device according to claim 1, wherein, on the pallet carrier, a vacuum inlet respectively is connected, with one of at least two vacuum bells, said vacuum bells being placed in the pallet carrier in such a way that they are pneumatically extendable to a vacuum inlet of the pallet and retractable into the pallet carrier.

8. The device according to claim 1, wherein, on the pallet carrier, one hydraulic inlet each is provided on a pair of hydraulic cylinders per pallet level, by means of which the respective pallet in one of two pallet levels of the pallet carrier can be docked and undocked via props which are extendably and retractably arranged.

9. The device according to claim 1, wherein, on the pallet carrier, one electrical and/or opto-connection of the connectable power supply interface is connected with at least one signal transmitter provided on the inside of the pallet carrier.

10. The device according to claim 5, wherein the flexible and movable supply line duct is supported on the corresponding swivel arm.

11. The device according to claim 6, wherein the connections are connectable via quick-release couplings.

12. The device according to claim 7, wherein every vacuum bell is activatable or deactivatable via a valve.

13. The device according to claim 9, wherein the at least one signal transmitter is an inductive or optical coupler.

* * * * *